US011654719B2

(12) United States Patent
Yoshida

(10) Patent No.: US 11,654,719 B2
(45) Date of Patent: May 23, 2023

(54) PNEUMATIC TIRE

(71) Applicant: The Yokohama Rubber Co., LTD., Tokyo (JP)

(72) Inventor: Hiroyuki Yoshida, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 112 days.

(21) Appl. No.: 16/634,540

(22) PCT Filed: Jul. 25, 2018

(86) PCT No.: PCT/JP2018/027876
§ 371 (c)(1),
(2) Date: Jan. 27, 2020

(87) PCT Pub. No.: WO2019/022130
PCT Pub. Date: Jan. 31, 2019

(65) Prior Publication Data
US 2021/0086561 A1    Mar. 25, 2021

(30) Foreign Application Priority Data
Jul. 27, 2017    (JP) .............................. JP2017-145127

(51) Int. Cl.
*B60C 13/02*    (2006.01)
*B60C 11/01*    (2006.01)
*B60C 11/11*    (2006.01)

(52) U.S. Cl.
CPC ............... *B60C 11/01* (2013.01); *B60C 11/11* (2013.01); *B60C 13/02* (2013.01)

(58) Field of Classification Search
CPC ... B60C 11/01; B60C 2011/013; B60C 13/02; B60C 11/1369; B60C 11/11
See application file for complete search history.

(56) References Cited

U.S. PATENT DOCUMENTS

D774,447 S  * 12/2016 Mathis .......................... D12/605
D776,609 S  *  1/2017 Shondel ........................ D12/605
(Continued)

FOREIGN PATENT DOCUMENTS

| CN | 101670754 | 3/2010 |
| CN | 205439832 | 8/2016 |

(Continued)

OTHER PUBLICATIONS

JP 6142930 Machine Translation; Yamakawa, Takahiro (Year: 2017).*
International Search Report for International Application No. PCT/JP2018/027876 dated Aug. 28, 2018, 3 pages, Japan.

*Primary Examiner* — Robert C Dye
*Assistant Examiner* — Nicholas J Weiler
(74) *Attorney, Agent, or Firm* — Thorpe North & Western

(57) ABSTRACT

A pneumatic tire is provided. Side regions located outward of shoulder regions of a tread portion in a tire lateral direction are each provided with a pair of side blocks opposite each other across a side groove extending in the tire lateral direction, iteration elements each including the side groove and the pair of side blocks are arranged at an interval in a tire circumferential direction. A road contact surface of each of the side blocks has a recess/protrusion shape including a reference surface located on a side closer to the side groove and a step portion located on a side farther from the side groove and raised from the reference surface. The side groove includes a raised bottom portion raised from a groove bottom and coupling the pair of side blocks.

14 Claims, 5 Drawing Sheets

(56) References Cited

U.S. PATENT DOCUMENTS

| | | |
|---|---|---|
| 2008/0210355 A1 | 9/2008 | Harvey |
| 2009/0107600 A1 | 4/2009 | Missik-Gaffney et al. |
| 2010/0043934 A1 | 2/2010 | Harvey |
| 2010/0059157 A1 | 3/2010 | Ashton et al. |
| 2013/0139936 A1 | 6/2013 | Obara |
| 2015/0224826 A1 | 8/2015 | Ochi |
| 2017/0174007 A1 | 6/2017 | Kuwano |
| 2017/0197474 A1 | 7/2017 | Ishigaki |
| 2017/0267034 A1* | 9/2017 | Kageyama ............ B60C 13/002 |
| 2018/0022162 A1 | 1/2018 | Takemori |
| 2019/0009619 A1* | 1/2019 | Yokokawa ............. B60C 13/02 |
| 2019/0016179 A1 | 1/2019 | Yamakawa |

FOREIGN PATENT DOCUMENTS

| | | | |
|---|---|---|---|
| DE | 10 2007 047 496 | 4/2009 | |
| JP | H07-329510 | 12/1995 | |
| JP | 2001-219711 | 8/2001 | |
| JP | 2003-211915 | 7/2003 | |
| JP | 2004-291937 | 10/2004 | |
| JP | 2010-047251 | 3/2010 | |
| JP | 2010-115973 | 5/2010 | |
| JP | 2013-119277 | 6/2013 | |
| JP | 2017-114212 | 6/2017 | |
| JP | 6142930 B1 * | 6/2017 | ............ B60C 11/01 |
| JP | 2017-121876 | 7/2017 | |
| WO | WO 2014/054225 | 4/2014 | |
| WO | WO 2016/121874 | 8/2016 | |
| WO | WO 2017/122742 | 7/2017 | |

\* cited by examiner

PNEUMATIC TIRE

TECHNICAL FIELD

The present technology relates to a pneumatic tire suitable as a tire used for driving on unpaved roads and in particular relates to a pneumatic tire providing enhanced driving performance and cut resistance on unpaved roads.

BACKGROUND ART

For pneumatic tires used for driving on unpaved roads such as uneven ground, muddy ground, snowy roads, sandy ground, and rocky areas, a tread pattern is generally employed that is based on lug grooves or blocks including many edge components and that has a large groove area. For such a tire, driving performance on unpaved roads is enhanced by biting into mud, snow, sand, stone, rock, or the like on a road surface (hereinafter, referred to collectively as "mud or the like") to achieve traction performance and preventing grooves from being blocked with mud or the like. In particular, in tires intended for traveling in rocky areas, by providing blocks in side regions outward of shoulder regions (ground contact edges) in the tire lateral direction, the driving performance (rock performance) in rocky areas is enhanced (see, for example, Japan Unexamined Patent Publication No. 2010-047251).

However, in such a tire, while the blocks are formed in the shoulder regions and the side regions, since the groove area is also increased in these regions, stones, rocks, and foreign matter on road surfaces easily enter the grooves provided in the shoulder regions and the side regions, a disadvantage arises where the groove bottom is easily damaged (cut resistance is poor). Thus, there is a demand for measures for causing grooves to effectively bite into mud or the like to enhance the driving performance on unpaved roads (in particular, rocky areas), while preventing cut resistance from being degraded and providing such performance in a well-balanced, compatible manner.

SUMMARY

The present technology provides a pneumatic tire suitable as a tire used for driving on unpaved roads, the pneumatic tire providing enhanced driving performance and cut resistance on unpaved roads.

A pneumatic tire according to an embodiment of the present technology includes: a tread portion extending in a tire circumferential direction and having an annular shape; a pair of sidewall portions disposed on both sides of the tread portion; and a pair of bead portions disposed inward of the sidewall portions in a tire radial direction, side regions located outward of shoulder regions of the tread portion in a tire lateral direction being each provided with a pair of side blocks opposite each other across a side groove extending in the tire lateral direction, iteration elements each including the side groove and the pair of side blocks being arranged at an interval in the tire circumferential direction, a road contact surface of each of the side blocks having a recess/protrusion shape including a reference surface located on a side closer to the side groove and a step portion located on a side farther from the side groove and raised from the reference surface, and the side groove including a raised bottom portion raised from a groove bottom and coupling the pair of side blocks.

In the present technology, the side blocks having a complex recess/protrusion shape as described above are provided, and thus the number of edge components of the side blocks is increased, producing an excellent edge effect due to the side blocks. This allows driving performance on unpaved roads (particularly the rock performance) to be enhanced. On the other hand, the raised bottom portion provided in the side groove allows the cut resistance to be enhanced. Additionally, the raised bottom portion couples the pair of side blocks adjacent to the side groove, increasing the rigidity of the pair of side blocks and the raised bottom portion, which form a set of protrusion portions. This is advantageous in enhancing rock performance.

In the present technology, the side blocks included in each of the iteration elements preferably have a shape in which the block width converges toward the side groove as the side block extends inward in the tire radial direction. Accordingly, the side grooves each extend with an approximately constant width, whereas groove portions, each formed between the iteration elements adjacent in the tire circumferential direction, have a width increasing as the groove portion extends inward in the tire radial direction. The side grooves and the groove portions are alternately disposed in the tire circumferential direction. Thus, the edge effect can be exerted on rocks and the like of various sizes, and the discharge performance on mud or the like is also enhanced. This is advantageous in enhancing the driving performance on unpaved roads.

In the present technology, a ratio A/SH, to a tire cross-sectional height SH, of a vertical distance A measured from a ground contact edge position of the tread portion in the tire radial direction to a radially inner edge of the side block is preferably from 0.15 to 0.50. Accordingly, the side blocks are favorably disposed, and this is advantageous in enhancing the driving performance on unpaved roads (particularly the rock performance).

In the present technology, a projection amount of the reference surface of the side block from a groove bottom of the side groove is preferably from 8 mm to 13 mm. The projection amount thus set optimizes the size of the side block, and this is advantageous in enhancing the driving performance on unpaved roads (particularly the rock performance).

In the present technology, a projection amount of the step portion of the side block from the groove bottom of the side groove is preferably from 110% to 130% of the projection amount of the reference surface of the side block from the groove bottom of the side groove. The projection amount thus set provides the side block with a favorable recess/protrusion shape, and this is advantageous in enhancing the driving performance on unpaved roads (particularly the rock performance).

In the present technology, an area of a top surface of the step portion of the side block, the side block being viewed from a road contact surface, is preferably from 40% to 60% of an area of an entire road contact surface of the side block. With the area ratio thus set of the step portion to the entire road contact surface of the side block, the side block has a favorable recess/protrusion shape. This is advantageous in enhancing the driving performance on unpaved roads (particularly the rock performance).

In the present technology, a ratio B/SH, to the tire cross-sectional height SH, of a vertical distance B measured from the ground contact edge position of the tread portion in the tire radial direction to a radially inner edge of the raised bottom portion is preferably from 0.20 to 0.40. Accordingly, the raised bottom portion is favorably disposed, and this is advantageous for providing both cut resistance and driving performance on unpaved roads (particularly the rock performance) in a compatible manner.

In the present technology, a projection amount of the raised bottom portion from the groove bottom of the side groove is preferably from 3 mm to 5 mm. The projection amount thus set optimizes the size of the raised bottom portion, and this is advantageous for providing both cut resistance and driving performance on unpaved roads (particularly the rock performance) in a compatible manner.

In the present technology, various lengths are lengths in the tread contact surface unless otherwise noted. "Road contact surface" of each block is a surface portion of each block actually contacting a plane on which the tire is placed, in a case where the tire is mounted on a regular rim, inflated to a regular internal pressure, placed perpendicularly to the plane, and subjected to a regular load. The road contact surface does not include, for example, a chamfered portion that does not actually contact the plane. Additionally, "ground contact edge" refers to both ends in the tire axial direction in this state. "Regular rim" is a rim defined for each tire by a standard in a system of standards including the standard on which the tire is based and refers to a "standard rim" in a case of JATMA (Japan Automobile Tyre Manufacturers Association, Inc.), refers to a "design rim" in a case of TRA (The Tire and Rim Association, Inc.), or refers to a "measuring rim" in a case of ETRTO (European Tire and Rim Technical Organization). "Regular internal pressure" is an air pressure defined for each tire by a standard in a system of standards including the standard on which the tire is based and refers to a "maximum air pressure" in a case of JATMA, refers to the maximum value in the table of "TIRE ROAD LIMITS AT VARIOUS COLD INFLATION PRESSURES" in a case of TRA, or refers to the "INFLATION PRESSURE" in a case of ETRTO. For a tire for a passenger vehicle, the regular internal pressure is 180 kPa. "Regular load" is a load defined for each tire by a standard in a system of standards including the standard on which the tire is based and refers to "maximum load capacity" in a case of JATMA, refers to the maximum value in the table of "TIRE ROAD LIMITS AT VARIOUS COLD INFLATION PRESSURES" in a case of TRA, or refers to "LOAD CAPACITY" in a case of ETRTO. For a tire for a passenger vehicle, the regular load is a load corresponding to 88% of the load described above.

DETAILED DESCRIPTION

Configurations of embodiments of the present technology will be described in detail below with reference to the accompanying drawings.

Figure 1:
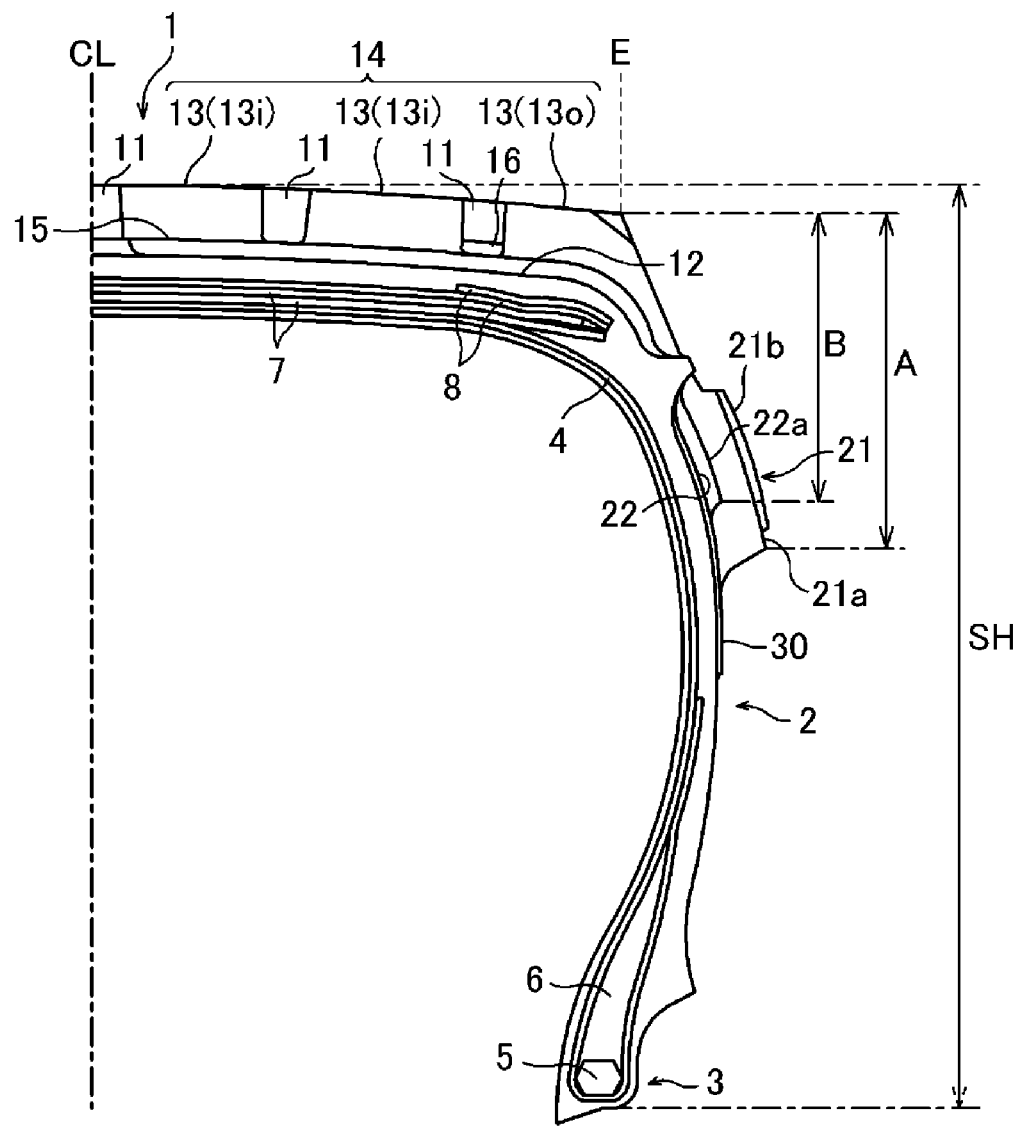
FIG. 1 is a meridian cross-sectional view of a pneumatic tire according to an embodiment of the present technology.

As illustrated in FIG. 1, the pneumatic tire of an embodiment of the present technology includes a tread portion 1 having an annular shape and extending in the tire circumferential direction, a pair of sidewall portions 2 disposed on both sides of the tread portion 1, and a pair of bead portions 3 disposed inward of the sidewall portions 2 in the tire radial direction. Note that, in FIG. 1, reference sign "CL" denotes a tire equator, and reference sign "E" denotes a ground contact edge.

A carcass layer 4 is mounted between the left-right pair of bead portions 3. The carcass layer 4 includes a plurality of reinforcing cords extending in the tire radial direction and is folded back around a bead core 5 disposed in each of the bead portions 3 from a vehicle inner side to a vehicle outer side. Additionally, bead fillers 6 are disposed on the periphery of the bead cores 5, and each of the bead fillers 6 is enveloped by a body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, from 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, from 0° to 5°.

The present technology may be applied to such a general pneumatic tire; however, the cross-sectional structure thereof is not limited to the basic structure described above. In addition, the present technology is directed to a tire intended for traveling in rocky areas and including side blocks described below in side regions outward of respective ground contact edges E in the tire lateral direction, and the present technology defines the shape of the side regions (side blocks). Thus, the shape inward of each of the ground contact edges E in the tire lateral direction (namely, a tread pattern) is not particularly limited. For example, in the aspect in FIG. 2, the tread pattern has the following structure. Note that the pattern in FIG. 2 cooperates with the structure of each of the side regions described below and thus demonstrates excellent driving performance on unpaved roads.

Figure 2:
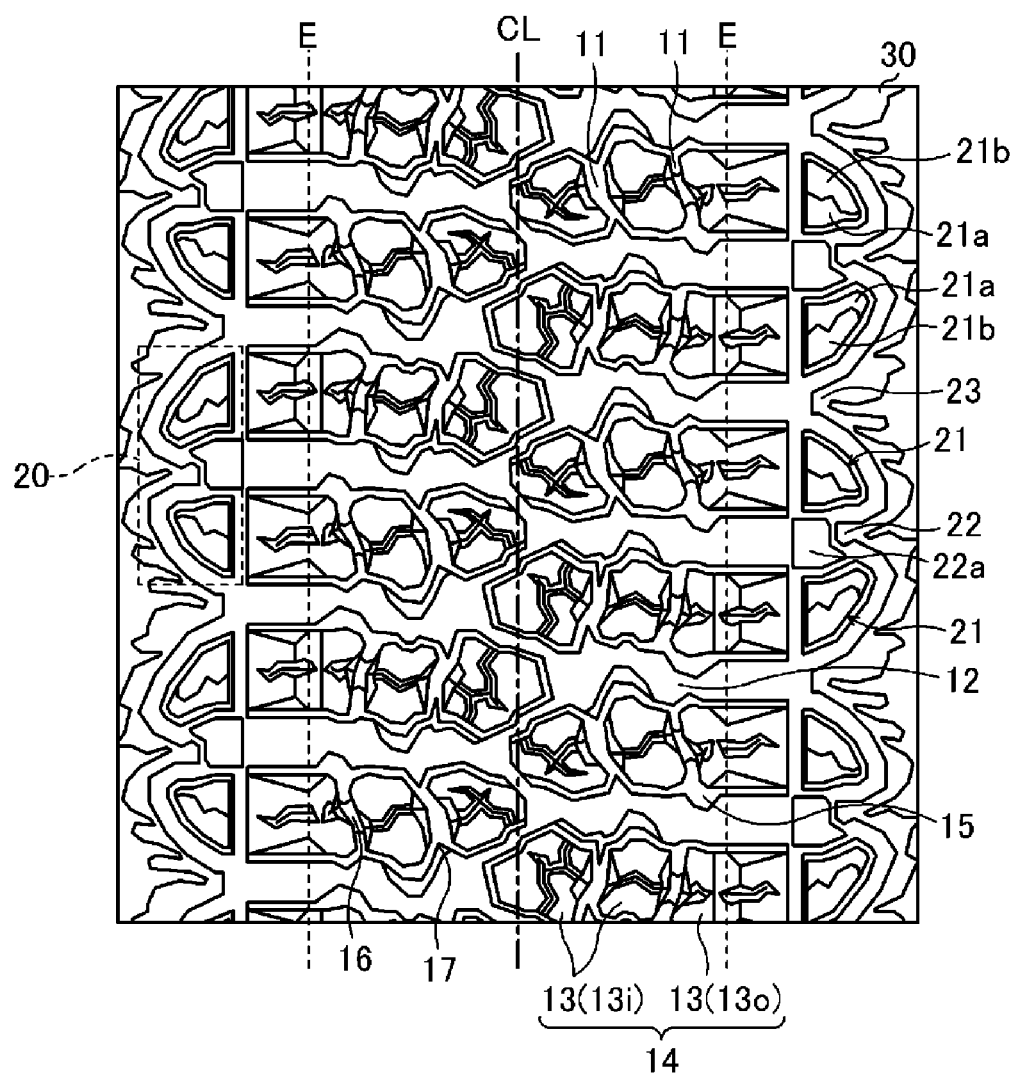
FIG. 2 is a front view illustrating a tread surface of a pneumatic tire according to an embodiment of the present technology.

In the example in FIG. 2, the following are formed: a plurality of longitudinal grooves 11 extending in the tire circumferential direction, a plurality of lateral grooves 12 extending in the tire lateral direction, and a plurality of blocks 13 defined by the longitudinal grooves 11 and the lateral grooves 12. In particular, in FIG. 2, among the plurality of blocks 13, inward in the tire lateral direction of a block 13 located on an outermost side in the tire lateral direction (hereinafter referred to as an outermost block 13o), a plurality of blocks 13 (hereinafter referred to as inner blocks 13i) are arranged side by side along the tire lateral direction with respect to the outermost block 13o. Then, block groups 14, each including the outermost block 13o and the plurality of inner blocks 13i thus arranged (that is, at least three blocks 13 that include the outermost block 13o and that are adjacent to one another in the tire lateral direction), are repeatedly arranged in the tire circumferential direction with the lateral grooves 12 interposed between the block groups. In the illustrated example, the block group 14 includes three blocks 13 including the outermost block 13o and two of the inner blocks 13i.

Each of the block groups 14 includes a flat top surface raised from the groove bottoms of the lateral grooves 12, and a platform 15 having a stage shape is present on the top surface, on which the blocks 13 and the longitudinal grooves 11 can be disposed. In this case, the longitudinal grooves 11 located between the blocks 13 forming each of the block groups 14 are also present on the platform 15, and the groove bottoms of the longitudinal grooves 11 are located flush with the top surface of the platform 15 or closer to the block road contact surface than the top surface of the platform 15. Each of the platforms 15, as viewed from the block road contact surface, has a shape that protrudes toward both sides in the tire circumferential direction with respect to at least three blocks 13 forming each of the platforms 15, and the contour line of each of the platforms 15 bends along the contour lines of at least three blocks 13 forming each of the platforms 15.

In addition, at the groove bottom of the longitudinal groove 11 adjacent to the outermost block 13o, a raised bottom portion 16 is provided, which is raised from the groove bottom of the longitudinal groove 11. The raised bottom portion 16 couples the outermost block 13o to the inner block 13i adjacent to the outermost block 13o.

Figure 3:
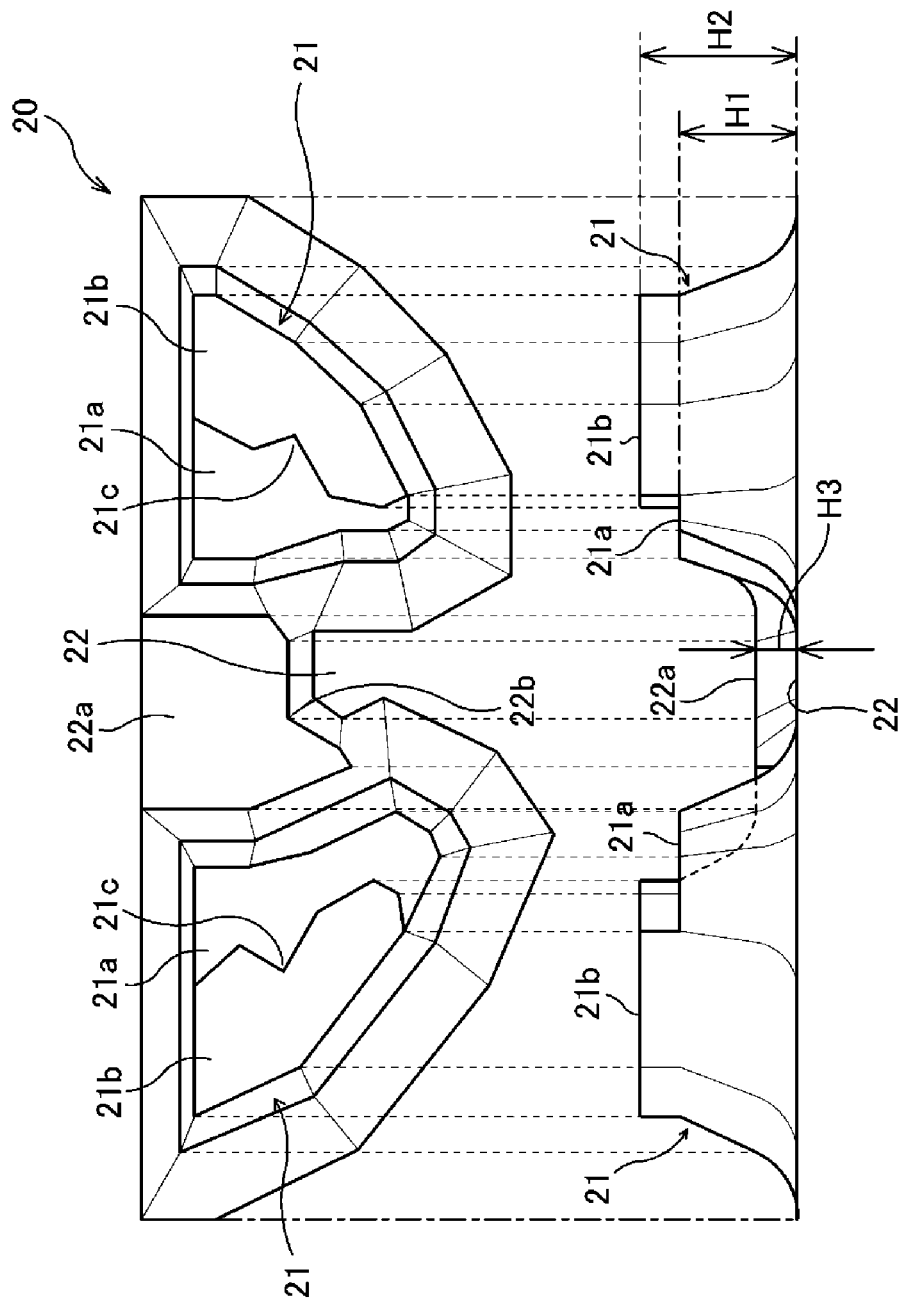
FIG. 3 is an explanatory diagram illustrating a combination of a front view (viewed from a tire side surface) and a side view (viewed from the inner side in the tire radial direction) of an iteration element of the present technology.

The shape of the side regions of a pneumatic tire according to embodiments of the present technology will be described below in detail with reference to FIG. 2 and FIG. 3.

A plurality of side blocks 21 are formed in the side regions of the pneumatic tire according to an embodiment of the present technology. As illustrated in the drawings, the side blocks 21 are paired and located opposite each other across side groove 22 extending in the tire lateral direction, and the pair of side blocks 21 and the side grooves 22 form an iteration element 20. Iteration elements 20 are arranged at intervals in the tire circumferential direction.

The road contact surface of each side block 21 is not flat, but has a recess/protrusion shape including a reference surface 21a located on a side closer to the side groove 22 and a step portion 21b located on a side farther from the side groove 22 and raised from the reference surface 21a. On the other hand, a raised bottom portion 22a raised from the groove bottom to couple the pair of side blocks 21 is formed at the groove bottom of the side groove 22. In particular, in the illustrated example, the raised bottom portion 22a is formed extending from an outermost side of the side groove 22 in the tire radial direction to a midway portion of the side groove 22.

In this way, the side region is provided with the side blocks 21 each having a complex recess/protrusion shape and the side grooves 22, and thus, the excellent edge effect thereof allows enhancement of the driving performance on unpaved roads (particularly rock performance). On the other hand, the raised bottom portion 22a provided in the side groove 22 allows cut resistance to be enhanced. Additionally, the raised bottom portion 22a couples the pair of side blocks 21 adjacent to the side grooves 22, increasing the rigidity of the pair of side blocks and the raised bottom portion, which form a set of protrusion portions. This is advantageous in enhancing the durability of the side blocks 21 and enhancing the rock performance.

In this case, the side blocks 21 included in each of the iteration elements 20 preferably have a shape (substantially triangular shape) in which the block width converges toward the side groove 22 as the side block 21 extends inward in the tire radial direction. With such a shape, with respect to the side groove 22 extending with an approximately constant width, whereas groove portions 23, each formed between the iteration elements 20 adjacent in the tire circumferential direction, have a width increasing as the groove portion extends inward in the tire radial direction. The side grooves 22 and the groove portions 23 as described above are alternately disposed in the tire circumferential direction. Thus, the edge effect can be exerted on rocks and the like with various sizes, and the groove portions 23 deliver enhanced discharge performance on mud or the like. This is advantageous in enhancing the driving performance on unpaved roads.

The step portion 21b of the side block 21 is raised from the reference surface 21a as described above. However, as illustrated, the step portion 21b preferably includes a notch 21c having a v-shape formed in a side surface of the step portion 21b on a side of the reference surface 21a. With such notch 21c formed, the step portion 21b includes an increased number of edge components. This is advantageous in enhancing the driving performance on unpaved roads.

Additionally, as illustrated, inner edges of the raised bottom portion 22a in the tire radial direction is preferably inclined with respect to the width direction (tire circumferential direction) of the side groove 22, and a notch 22b having a v-shape may be formed in this edge. Such a shape also allows the raised bottom portion 22a to increase the number of edge components. This is advantageous in enhancing the driving performance on unpaved roads.

A projection amount H1 of the reference surface 21a of the side block 21 from the groove bottom of the side groove 22 is preferably, for example, from 8 mm to 13 mm. Additionally, a projection amount H2 of the step portion 21b of the side block 21 from the groove bottom of the side groove 22 is preferably, for example, from 110% to 130% of the projection amount H1. The projection amounts H1 and H2 of the corresponding portions thus set provide the side block 21 with a favorable recess/protrusion shape. This is advantageous in enhancing the driving performance on unpaved roads (particularly the rock performance). In this case, the projection amount H1 of less than 8 mm leads to excessively small side blocks 21, and thus obtaining a sufficient effect from the provision of the side blocks 21 is difficult. The projection amount H1 of greater than 13 mm increases the amount (weight) of rubber in the sidewall portion 2, possibly degrading traction performance to affect traveling properties on unpaved roads (in particular, rocky areas). The projection amount H2 of less than 110% of the projection amount H1 makes the top surface of the side block 21 substantially flat, thus limiting the effect of enhancing the rock performance. The projection amount H2 of greater than 130% of the projection amount H1 leads to excessive projection of the step portion 21b only, degrading the durability of the side block 21 (step portion 21b).

Additionally, a projection amount H3 of the raised bottom portion 22a from the groove bottom of the side groove 22 is preferably, for example, from 3 mm to 5 mm. The projection amount of the raised bottom portion 22a thus set within the appropriate range optimizes the size of the raised bottom portion. This is advantageous in providing both cut resistance and driving performance on unpaved roads (particularly the rock performance) in a compatible manner. In this case, the projection amount H3 of less than 3 mm substantially prevents the groove bottom of the side groove 22 from being raised, precluding the side groove 22 from coupling the side blocks 21 to sufficiently increase the rigidity of the side blocks 21. The projection amount H1 of greater than 5 mm reduces the groove volume of the side groove 22, and the discharge performance on mud or the like may be affected.

The side blocks 21 are formed in the side regions, but in particular, the side blocks are preferably provided in a range that comes into contact with mud or the like during traveling on unpaved roads (in particular, in a range that comes into contact with the rocks during traveling in rocky areas). Specifically, as illustrated in FIG. 1, a ratio A/SH, to a tire cross-sectional height SH, of a vertical distance A measured from the position of the ground contact edge E in the tire radial direction to the radially inner edge of the side block 21 is preferably, for example, from 0.15 to 0.50. Accordingly, the side blocks are favorably disposed, and this is advantageous in enhancing the driving performance on unpaved roads (particularly the rock performance). In this case, the ratio A/SH of less than 0.15 reduces the length of the side block 21 in the tire radial direction to make the side block 21 itself smaller, thus limiting the effect of the side block 21. The ratio A/SH of greater than 0.50 increases the amount (weight) of rubber in the sidewall portion 2, possibly degrading the traction performance to affect the traveling properties on unpaved roads (in particular, rocky areas).

In addition, since the raised bottom portion 22a is formed in the side groove 22 between the side blocks 21, at least the raised bottom portion 22a is formed in a ratio A/SH in the range described above. However, in a case where the most of the side groove 22 includes a raised bottom, the groove volume of the side groove decreases, and the driving performance on unpaved roads may be affected. Thus, as illustrated in FIG. 1, a ratio B/SH, to the tire cross-sectional height SH, of a vertical distance B measured from the position of the ground contact edge E in the tire radial direction to radially inner edge of the raised bottom portion 22a is preferably, for example, from 0.20 to 0.40. Accordingly, the raised bottom portion 22a is favorably disposed, and this is advantageous in providing both cut resistance and driving performance on unpaved roads (particularly the rock performance) in a compatible manner. In this case, the ratio B/SH of less than 0.20 reduces the length of the raised bottom portion 22a in the tire radial direction to make the raised bottom portion 22a itself smaller, thus limiting the effect of the raised bottom portion 22a. A ratio B/SH of greater than 0.40 increases the rate of the raised bottom portion 22a occupied in the side groove 22 to reduce the groove volume of the side groove 22. This may affect the discharge performance on mud or the like. More preferably, in consideration of a size balance between the side block 21 and the raised bottom portion 22a, a ratio B/A between the vertical distance A and the vertical distance B may be set in a range from 0.65 to 0.90, for example.

Figure 4A:
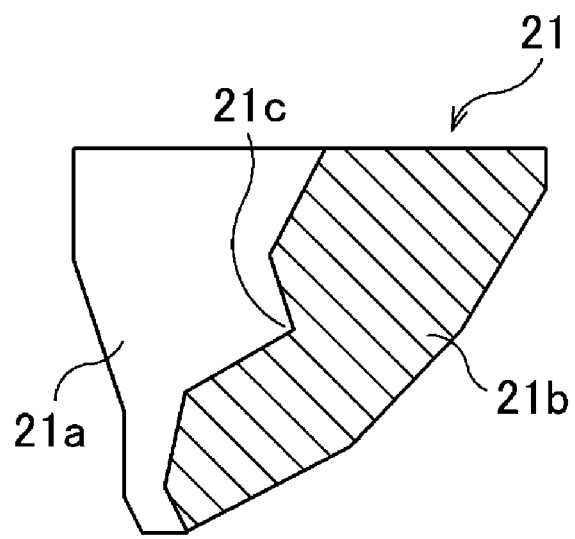
FIG. 4 is an explanatory diagram illustrating the area of a step portion of a side block.
Figure 4B:
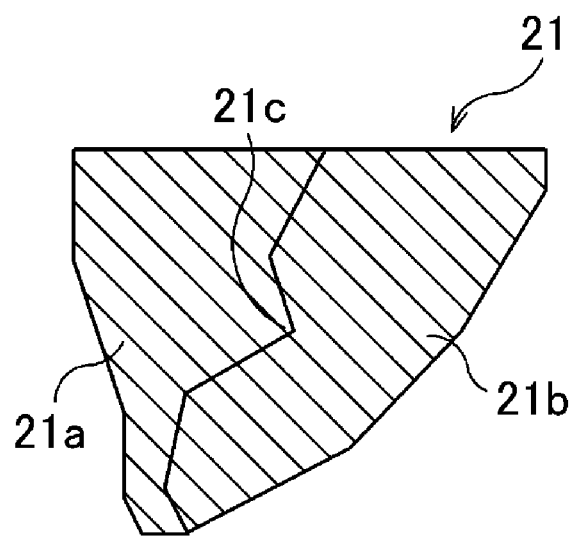

In order to enhance the driving performance on unpaved roads (particularly the rock performance) based on the recess/protrusion shape of the side blocks 21 described above, a good balance is preferably maintained between the reference surface 21a and the step portion 21b of the side block 21. Specifically, as illustrated in FIG. 4, the area of the top surface of the step portion 21b as viewed from the road contact surface side (hatched portion in FIG. 4A) is preferably, for example, from 40% to 60% of the area of the entire road contact surface of the side block 21 (hatched portion in FIG. 4B). The area ratio of the step portion 21b to the entire road contact surface of the side block 21 thus set provides the side block 21 with a favorable recess/protrusion shape. This is advantageous in enhancing the driving performance on unpaved roads (particularly the rock performance). In this case, when the area of the top surface of the step portion 21b is less than 40% of the area of the entire road contact surface of the side block 21, the step portion 21b is smaller, thus limiting the effect of the step portion 21b. When the area of the top surface of the step portion 21b is greater than 60% of the area of the entire road contact surface of the side block 21, the proportion of the step portion 21b occupied in the side block 21 increases and is substantially equivalent to the an increased projection height of the entire road contact surface of the side block 21. This limits the effect in which the number of edge components is increased by the step. Additionally, the amount of rubber (weight) in the sidewall portion 2 increases, and this may degrade the traction performance to affect the traveling properties on unpaved roads (particularly rocky areas).

The present technology can provide an aspect in which, as illustrated in FIG. 2, all of the iteration elements 20 are present on a platform 30 raised from 8 mm to 17 mm from the outer surface of the sidewall portion 2 and including a flat top surface, the platform 30 having a contour line having a random amplitude and bending zigzag. Accordingly, the platform 30 produces an edge effect and increases the rigidity of all of the iteration elements 20 formed on the tire circumference, allowing improvement of the durability of the iteration elements 20. This is advantageous in enhancing the driving performance on unpaved roads (particularly the rock performance).

Figure 5:
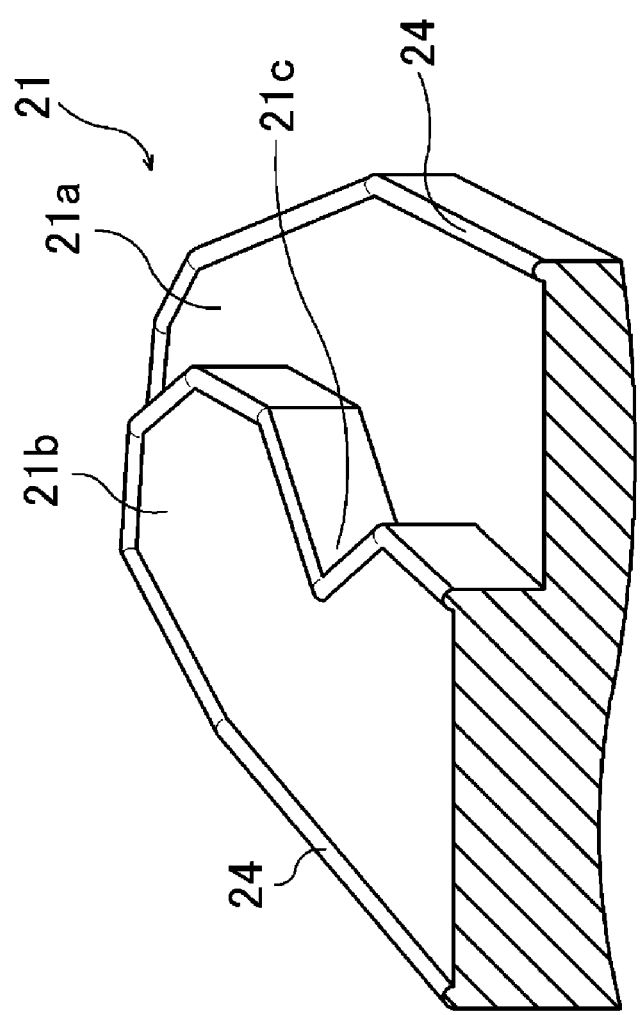
FIG. 5 is an explanatory diagram illustrating another example of another side block of the present technology.

As illustrated in FIG. 5, a peripheral portion of the road contact surface of the side block 21 of the present technology can be provided with a ridge 24 extending along the peripheral portion. Provision of the ridge 24 as described above allows the side blocks 21 to easily bite into mud or the like during traveling on unpaved roads. This is advantageous in enhancing the driving performance on unpaved roads. Additionally, the tire provided with the side blocks 21 in the side regions as in the present technology may have degraded air removing properties during vulcanization molding, but the ridges 24 as described above serve to prevent the degradation. In this case, a mold is provided with grooves for forming the above-described ridges 24, and air in the mold can be discharged through the grooves. This allows enhancement of the manufacturability of the tire provided with the complex side blocks 21 as in the present technology. In this case, by coupling the grooves for forming the ridges 24 to vent holes, particularly excellent air removing properties can be provided.

In a case where the side blocks 21 and the like of the present technology are combined with the tread pattern in FIG. 2, the side blocks 21 may be disposed such that the side groove 22 is disposed on an extension line of the lateral groove 12 and such that the side blocks 21 is outwardly adjacent to the outermost block 13o in the tire lateral direction. Additionally, as illustrated, the groove width of the side groove 22 is preferably equivalent to the groove width of the lateral groove 12 at the position of the ground contact edge E, and the block width of the side block 21 at the outermost side in the tire radial direction is preferably equivalent to the block width of the outermost block 13o at the position of the ground contact edge E.

EXAMPLES

Twenty-three types of tires according to Conventional Example 1, Comparative Examples 1 and 2, and Examples 1 to 20 were manufactured. The tires have a tire size of 35×12.50R17, have a basic structure illustrated in FIG. 1, and is based on the tread pattern in FIG. 2. In regard to the structure of the side region, the tires are set for each of: the presence of the step portion of the side block; the presence of the raised bottom portion in the side groove; the ratio A/SH, to the tire cross-sectional height SH, of the vertical distance A measured from the ground contact edge position of the tread portion in the tire radial direction to the radially inner edge of the side block; the projection amount H1 of the reference surface of the side block from the groove bottom of the side groove; the ratio, to the projection amount H1, of the projection amount H2 of the step portion of the side block from the groove bottom of the side groove (ratio H2/H1×100%); the ratio of the area of the top surface of the step portion of the side block to the area of the entire road contact surface of the side block; the ratio B/SH, to the tire cross-sectional height SH, of the vertical distance B measured from the ground contact edge position of the tread portion in the tire radial direction to the radially inner edge of the raised bottom portion; and the projection amount H3 of the raised bottom portion from the groove bottom of the side groove as indicated in Tables 1 to 3.

The pneumatic tires are evaluated for rock performance and cut resistance by the following evaluation method, and the results are also indicated in Tables 1 to 3.

Rock Performance

The test tires were assembled on wheels having a rim size of 17×10.0J, inflated to an air pressure of 240 kPa, and mounted on a test vehicle (four wheel drive vehicle). Sensory evaluation by a test driver was performed on a rocky road surface in terms of traction performance and startability. Evaluation results are expressed as index values with Conventional Example 1 being assigned the index value of 100. Larger index values indicate more excellent rock performance.

Cut Resistance Performance

After evaluation of the rock performance described above, the edge length of cut damage occurring in the side regions and the shoulder regions was measured. Evaluation results are expressed as index values with the reciprocal of each value in Conventional Example 1 being assigned the index value of 100. Larger index values indicate more excellent cut resistance performance.

TABLE 1-1

|  |  | Conventional Example 1 | Comparative Example 1 | Comparative Example 2 |
|---|---|---|---|---|
| Presence of step portion |  | No | Yes | No |
| Presence of raised bottom portion |  | No | No | Yes |
| Ratio A/SH |  | 0.37 | 0.37 | 0.37 |
| Projection amount H1 | mm | 12.5 | 12.5 | 12.5 |
| H2/H1 × 100 | % | — | 120 | — |
| Area ratio | % | — | 58 | — |
| Ratio B/SH |  | — | — | 0.31 |
| Projection amount H3 | mm | — | — | 4 |
| Rock Performance | Index value | 100 | 101 | 100 |
| Cut resistance | Index value | 100 | 100 | 101 |

TABLE 1-2

|  |  | Example 1 | Example 2 | Example 3 | Example 4 |
|---|---|---|---|---|---|
| Presence of step portion |  | Yes | Yes | Yes | Yes |
| Presence of raised bottom portion |  | Yes | Yes | Yes | Yes |
| Ratio A/SH |  | 0.37 | 0.15 | 0.5 | 0.37 |
| Projection amount H1 | mm | 12.5 | 12.5 | 12.5 | 12.5 |
| H2/H1 × 100 | % | 120 | 120 | 120 | 120 |
| Area ratio | % | 58 | 58 | 58 | 58 |
| Ratio B/SH |  | 0.31 | 0.2 | 0.31 | 0.5 |
| Projection amount H3 | mm | 4 | 4 | 4 | 4 |
| Rock Performance | Index value | 108 | 103 | 103 | 102 |
| Cut resistance | Index value | 111 | 105 | 111 | 111 |

TABLE 2-1

|  |  | Example 5 | Example 6 | Example 7 | Example 8 |
|---|---|---|---|---|---|
| Presence of step portion |  | Yes | Yes | Yes | Yes |
| Presence of raised bottom portion |  | Yes | Yes | Yes | Yes |
| Ratio A/SH |  | 0.37 | 0.37 | 0.37 | 0.37 |

TABLE 2-1-continued

|  |  | Example 5 | Example 6 | Example 7 | Example 8 |
|---|---|---|---|---|---|
| Projection amount H1 | mm | 5 | 8 | 13 | 15 |
| H2/H1 × 100 | % | 120 | 120 | 120 | 120 |
| Area ratio | % | 58 | 58 | 58 | 58 |
| Ratio B/SH |  | 0.31 | 0.31 | 0.31 | 0.31 |
| Projection amount H3 | mm | 4 | 4 | 4 | 4 |
| Rock Performance | Index value | 103 | 105 | 106 | 104 |
| Cut resistance | Index value | 111 | 111 | 111 | 111 |

TABLE 2-2

|  |  | Example 9 | Example 10 | Example 11 | Example 12 |
|---|---|---|---|---|---|
| Presence of step portion |  | Yes | Yes | Yes | Yes |
| Presence of raised bottom portion |  | Yes | Yes | Yes | Yes |
| Ratio A/SH |  | 0.37 | 0.37 | 0.37 | 0.37 |
| Projection amount H1 | mm | 12.5 | 12.5 | 12.5 | 12.5 |
| H2/H1 × 100 | % | 105 | 110 | 120 | 135 |
| Area ratio | % | 58 | 58 | 58 | 58 |
| Ratio B/SH |  | 0.31 | 0.31 | 0.31 | 0.31 |
| Projection amount H3 | mm | 4 | 4 | 4 | 4 |
| Rock Performance | Index value | 103 | 105 | 106 | 104 |
| Cut resistance | Index value | 111 | 111 | 111 | 111 |

TABLE 3-1

|  |  | Example 13 | Example 14 | Example 15 | Example 16 |
|---|---|---|---|---|---|
| Presence of step portion |  | Yes | Yes | Yes | Yes |
| Presence of raised bottom portion |  | Yes | Yes | Yes | Yes |
| Ratio A/SH |  | 0.21 | 0.21 | 0.21 | 0.21 |
| Projection amount H1 | mm | 12.5 | 12.5 | 12.5 | 12.5 |
| H2/H1 × 100 | % | 120 | 120 | 120 | 120 |
| Area ratio | % | 32 | 40 | 58 | 65 |
| Ratio B/SH |  | 0.1 | 0.1 | 0.1 | 0.1 |
| Projection amount H3 | mm | 4 | 4 | 4 | 4 |
| Rock Performance | Index value | 103 | 105 | 107 | 104 |
| Cut resistance | Index value | 111 | 111 | 111 | 111 |

TABLE 3-2

|  |  | Example 17 | Example 18 | Example 19 | Example 20 |
|---|---|---|---|---|---|
| Presence of step portion |  | Yes | Yes | Yes | Yes |
| Presence of raised bottom portion |  | Yes | Yes | Yes | Yes |
| Ratio A/SH |  | 0.21 | 0.21 | 0.21 | 0.21 |
| Projection amount H1 | mm | 12.5 | 12.5 | 12.5 | 12.5 |
| H2/H1 × 100 | % | 120 | 120 | 120 | 120 |
| Area ratio | % | 58 | 58 | 58 | 58 |
| Ratio B/SH |  | 0.1 | 0.1 | 0.1 | 0.1 |
| Projection amount H3 | mm | 1 | 3 | 4 | 6 |
| Rock Performance | Index value | 108 | 108 | 105 | 103 |
| Cut resistance | Index value | 102 | 106 | 111 | 111 |

As is clear from Tables 1 to 3, compared to Conventional Example 1, Examples 1 to 20 all provide enhanced rock performance and cut resistance and achieve both rock performance and cut resistance in a well-balanced, compatible manner to a high degree. Although only the rock performance on the rocky road surface was evaluated, when traveling on other unpaved roads (mud roads, snowy roads, sandy ground, and the like), the tires of the present technology exhibits a function, similar to the function accomplished on rocks on the rocky road surface, on mud, snow, sand, stones, and the like on the road surface. The tires of the present technology can favorably deliver excellent driving performance on unpaved roads.

On the other hand, Comparative Example 1 includes the step portion but not the raised bottom portion and thus fails to enhance the cut resistance. Comparative Example 2 includes the raised bottom portion but not the step portion and thus fails to enhance the rock performance.

The invention claimed is:

1. A pneumatic tire comprising: a tread portion extending in a tire circumferential direction and having an annular shape; a pair of sidewall portions disposed on both sides of the tread portion; and a pair of bead portions disposed inward of the sidewall portions in a tire radial direction,
   side regions located outward of shoulder regions of the tread portion in a tire lateral direction being each provided with a pair of side blocks opposite each other across a side groove extending in the tire lateral direction,
   iteration elements each comprising the side groove and the pair of side blocks being arranged at an interval in the tire circumferential direction,
   an outer surface of each of the side blocks having a recess/protrusion shape comprising a reference surface located on a side closer to the side groove and a step portion located on a side farther from the side groove and raised from the reference surface, and
   the side groove comprising a raised bottom portion raised from a groove bottom and coupling the pair of side blocks, and adjacent iteration elements not having the raised bottom portion disposed therebetween.

2. The pneumatic tire according to claim 1, wherein the side blocks included in each of the iteration elements have a shape in which block width converges toward the side groove as the side blocks extend inward in the tire radial direction.

3. The pneumatic tire according to 1, wherein a ratio A/SH, to a tire cross-sectional height SH, of a vertical distance A measured from a ground contact edge position of the tread portion in the tire radial direction to a radially inner edge of the side blocks is from 0.15 to 0.50.

4. The pneumatic tire according to claim 1, wherein a projection amount of the reference surface of the side blocks from a groove bottom of the side groove is from 8 mm to 13 mm.

5. The pneumatic tire according to claim 1, wherein a projection amount of the step portion of the side blocks from the groove bottom of the side groove is from 110% to 130% of the projection amount of the reference surface of the side blocks from the groove bottom of the side groove.

6. The pneumatic tire according to claim 1, wherein an area of a top surface of the step portion of the side blocks, the side blocks being viewed from the outer surface, is from 40% to 60% of an entire area of the outer surface of the side blocks.

7. The pneumatic tire according to claim 1, wherein a ratio B/SH, to the tire cross-sectional height SH, of a vertical distance B measured from the ground contact edge position of the tread portion in the tire radial direction to a radially inner edge of the raised bottom portion is from 0.20 to 0.40.

8. The pneumatic tire according to claim 1, wherein a projection amount of the raised bottom portion from the groove bottom of the side groove is from 3 mm to 5 mm.

9. The pneumatic tire according to claim 2, wherein a ratio A/SH, to a tire cross-sectional height SH, of a vertical distance A measured from a ground contact edge position of the tread portion in the tire radial direction to a radially inner edge of the side blocks is from 0.15 to 0.50.

10. The pneumatic tire according to claim 9, wherein a projection amount of the reference surface of the side blocks from a groove bottom of the side groove is from 8 mm to 13 mm.

11. The pneumatic tire according to claim 10, wherein a projection amount of the step portion of the side blocks from the groove bottom of the side groove is from 110% to 130% of the projection amount of the reference surface of the side blocks from the groove bottom of the side groove.

12. The pneumatic tire according to claim 11, wherein an area of a top surface of the step portion of the side blocks, the side blocks being viewed from the outer surface, is from 40% to 60% of an entire area of the outer surface of the side blocks.

13. The pneumatic tire according to claim 12, wherein a ratio B/SH, to the tire cross-sectional height SH, of a vertical distance B measured from the ground contact edge position of the tread portion in the tire radial direction to a radially inner edge of the raised bottom portion is from 0.20 to 0.40.

14. The pneumatic tire according to claim 13, wherein a projection amount of the raised bottom portion from the groove bottom of the side groove is from 3 mm to 5 mm.

* * * * *